Nov. 15, 1938.  C. F. TERRELL, JR  2,137,102
FLUID FLOW INDICATOR
Filed May 18, 1936
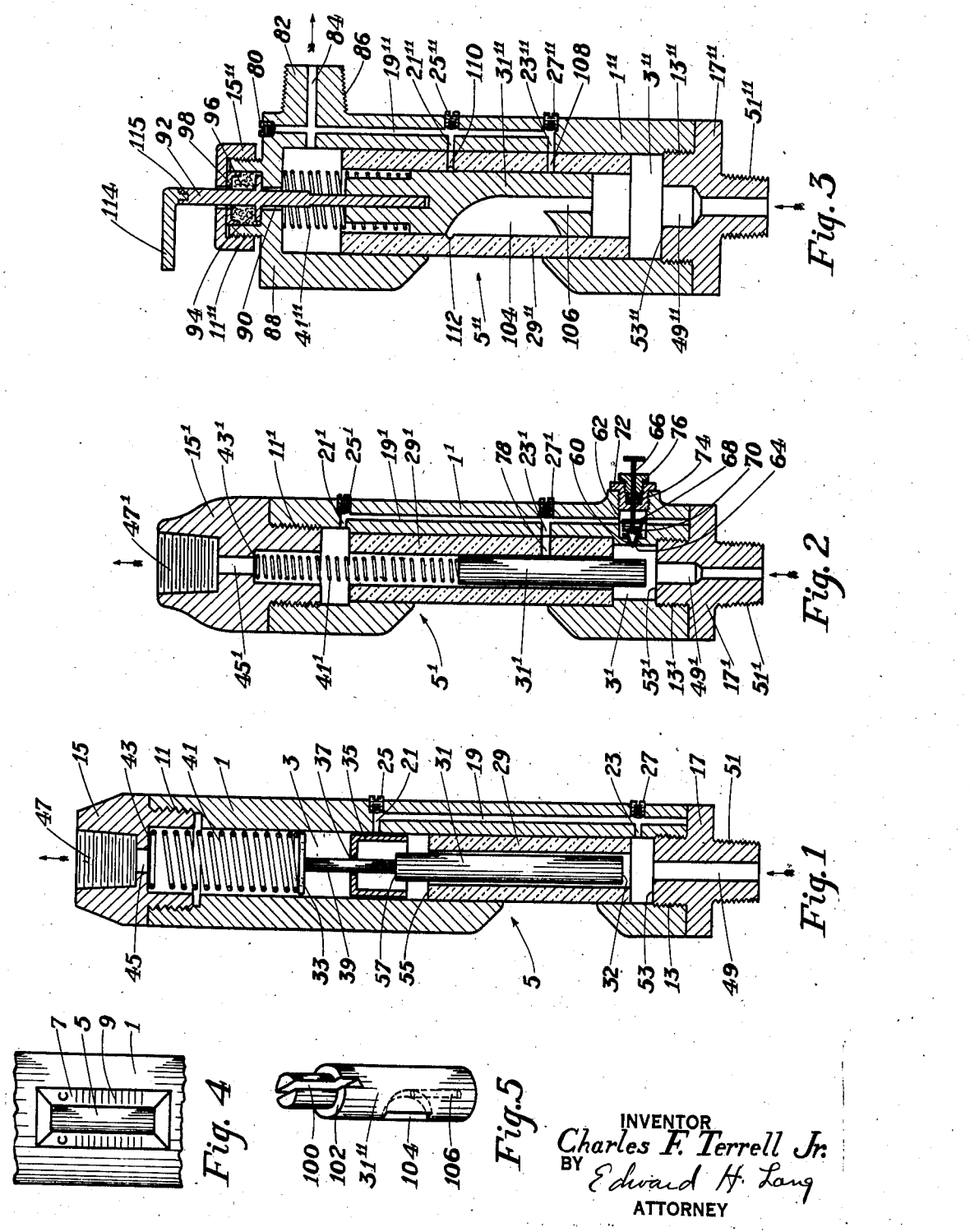
INVENTOR
Charles F. Terrell Jr.
BY Edward H. Lang
ATTORNEY Patented Nov. 15, 1938

2,137,102

UNITED STATES PATENT OFFICE 2,137,102

FLUID FLOW INDICATOR

Charles F. Terrell, Jr., Chicago, Ill., assignor to The Pure Oil Company, Chicago, Ill., a corporation of Ohio Application May 18, 1936, Serial No. 80,369

10 Claims. (Cl. 73—194)

This invention relates to fluid flow indicators and measuring devices, and is more particularly concerned with plunger type indicators for use in connection with force feed lubricators.

In my application Ser. No. 13,005 (Patent No. 2,047,715) I have disclosed several types of indicators in which the plunger was provided with a valve-controlled passageway for permitting continuous operation of the device. The devices in accordance with the present invention differ from those disclosed in my earlier application in several important respects. Instead of providing a valve-controlled passageway through the plunger to permit passage of fluid from inlet to outlet, as in the aforesaid application, I have provided a by-pass for permitting passage of fluid from inlet to outlet. The by-pass may be controlled by a separate valve or by the plunger. Another distinction between the present indicators and those of my earlier application is that the former do not necessarily operate continuously but may be operated only when the operator desires to check on the lubricator or other pumping device to which the indicator is attached in order to see that it is operating properly and pumping the desired volume of fluid. As a result, the device is subjected to much less wear than devices which operate continuously, thereby increasing the life thereof.

My invention will be more fully understood from a consideration of the following detailed description and the accompanying drawing, of which, Fig. 1 is a vertical cross-sectional view of one form of device constructed in accordance with my invention.

Fig. 2 is a vertical cross-sectional view of another form of device in accordance with my invention.

Fig. 3 is a vertical cross-sectional view of still a third form of device constructed in accordance with my invention.

Fig. 4 is a fragmentary, vertical, diagrammatic view of a section of the devices shown in Figures 1, 2, and 3; and Fig. 5 is a perspective view of the plunger forming part of the device shown in Fig. 3.

Numeral 1 indicates the body portion of the indicator which may be forged, cast, or otherwise made from steel, bronze, or other suitable metal. The body portion is formed with the cylindrical passageway 3 and one or more elongated slots 5. The vertical walls of the cylinder 7 bounding the slot 5 may be bevelled and calibrated as shown by the numeral 9, in cubic centimeters or other suitable volumetric units. The upper and lower ends of the body portion are tapped at 11 and 13 in order to receive the threaded caps 15 and 17 respectively. The lower portion of the body member is drilled vertically to form the narrow passageway 19 and also drilled horizontally to form the ports 21 and 23 which connect the passageway 19 to the passageway 3. The outer ends of the ports 21 and 23 are tapped to receive the closure screws 25 and 27 respectively. The lower end of the passageway 19 is closed by the cap 17.

A hollow, open ended cylinder 29 of transparent Bakelite or other transparent, preferably non-frangible, material, is press-fitted into the passageway 3 of the body portion 1. The cylinder 29 is preferably reamed or subjected to other machining operation after being press-fitted into the body portion in order that the cylindrical passageway therethrough may be of uniform diameter.

A cylindrical plunger 31, which is solid or at least has a solid bottom 32, is snugly mounted to reciprocate in the cylinder 29. The upper end of the plunger 31 is of smaller diameter than the lower end and extends beyond the upper end of the cylinder 29 and has a plate or circular spider 33 rigidly mounted on the top thereof. The member 33 fits loosely in the passageway 3. A sliding member 35 is mounted in the passageway 3 between the upper end of the cylinder 29 and the plate 33 mounted on the top of the plunger. The member 35 is snugly mounted to reciprocate in the passageway 3 and has an opening 37 centrally thereof to permit the stem 39 of the plunger 31 to pass therethrough. The opening 37 is sufficiently large in diameter to permit free passage of liquid therethrough, but is smaller in diameter than the main body of the plunger. The length of the sliding member or valve 35 is such as to close off the port 21 when the member is resting on the upper face 55 of the cylinder 29.

A coil or spiral spring 41 is mounted in the upper portion of the passageway 3 between the plate 33 and the inner face 43 of the cap 15. The cap 15 is formed with the passageway 45 centrally thereof and is tapped at 47 to receive a suitable nipple. The lower cap 17 is formed with a passageway 49 centrally thereof and the outer end of the cap is threaded at 51 in order to receive a suitable pipe coupling. The passageway 49 is smaller in diameter than the plunger 31 in order to enable the lower end of the plunger to come to rest on the inner face 53 of the cap member 17. The ports 21 and 23 are formed beyond the upper and lower ends of the cylinder 29.

The operation of the device is as follows: Assuming that the lower end of the plunger 31 is at rest on the upper face 53 of the cap 17 and that valve 35 covers port 21, lubricating oil is fed through the indicator by means of inlet passageway 49 and forces the plunger 31 upwardly. When the upper face 57 of the plunger abuts the horizontal portion of the sliding member or valve 35, it forces the sliding member upwardly with it. The spring 41 is being compressed during the upstroke of the plunger. When the plunger forces the valve 35 upwardly a sufficient distance to uncover the port 21, oil will then pass through the port 23, passageway 19 and port 21, into the passageway 3 and equalize the pressure above and below the plunger 31. The compressed spring 41 at this instant immediately returns the plunger to its initial position, displacing the oil beneath it through the port 23, passageway 19, and port 21 into the upper part of passageway 3. When the plunger has almost reached its initial position the plate 33 strikes the sliding member 35 and pushes it downwardly, thereby closing the port 21. The cycle then begins over again.

By observing the movement of the plunger through the slots 5, the distance the plunger travels in a given period of time can be observed and the amount of fluid passing therethrough can be determined.

Referring to Fig. 2, the device is formed with the body 1' having therein a cylindrical passageway 3' and one or more slots 5' similar to that shown in Fig. 4. The upper and lower ends of the body portion are tapped at 11' and 13' to receive the cap members 15' and 17'. A vertical passageway 19' is bored in the wall of the body portion and is connected to the interior of the body portion by means of the horizontal ports 21' and 23', the outer ends of which are tapped to receive the screws 25' and 27'. The lower end of the passageway 19' is closed by the cap 17'. The transparent hollow, open-ended cylinder 29' is press-fitted into the body portion and a solid plunger 31' is mounted to reciprocate therein. A coil or spiral spring 41' is mounted in the upper portion of the cylinder 29' and abuts at its lower end against the upper face of the plunger 31', and at its upper end against the inner face 43' of the cap member 15'. The cap member 15' is formed with the vertical passageway 45' centrally thereof and is tapped at 47' to receive a suitable nipple. The lower cap 17' has a vertical passageway 49' and is tapped at 51' to receive a suitable pipe coupling. The passageway 49' is smaller in diameter than the plunger 31' in order that the lower face of the plunger may rest on the inner face 53' of the cap member 17'.

The lower portion of the body 1' is bored horizontally at 60 and is counter-bored at 62 in order to connect the passageway 3' and passageway 19'. A valve 64 is adapted to seat in and close the bore 60. The valve 64 has a stem 66 which extends outside the body portion of the indicator. A plate 68 is rigidly mounted on the valve stem and a coil spring 70 is mounted between the plate 68 and the inner face of the counter-bore 62. The coil spring 70 is adapted to hold the valve in open position. A packing member 72 is adapted to be screwed into the outer end of the counter-bore 62 and packing material 74 is retained within the packing member 72 by means of the cap 76 which is adapted to be screwed into the packing member. The packing member 72 and the cap 76 are bored centrally thereof in order to permit the valve stem to pass therethrough. The valve is adapted to be operated by hand by merely pressing inwardly on the outer end of the stem.

The cylinder 29' is bored horizontally at 78 in order to connect the interior thereof with the port 23'.

The operation of the device shown in Fig. 2 is as follows: Assuming the plunger 31' is at rest on the inner face 53' of the lower cap member 17' and the valve 64 open, fluid will enter through the inlet passageway 49' and force the plunger 31' from its seat sufficiently to permit the fluid to pass into the passageway 3', then through the bore and counter-bore 60 and 62, through the passageway 19', port 21' and out through the passageway 45'. Normally the indicator does not function. When it is desired to determine whether the lubricator or other pumping means to which the indicator is attached is functioning properly, the operator presses the valve stem 66 inwardly until the valve closes the bore 60. The plunger 31' is then forced upwardly by the fluid pressure until the lower end of the plunger passes beyond the bore 78, whereupon the fluid may pass through port 23', passageway 19' and port 21' into the upper part of passageway 3' and out through the outlet passageway 45'. By providing the connection from the interior of the cylinder 29' to the passageway 19' through the passageway 78 and port 23', there is no possibility that the operator may wreck the device by forgetting to open the valve. The movement of the plunger 35 can be observed while the valve is held in closed position and the time required for it to move through its upstroke can be observed. By releasing the valve and opening the passageway from the lower end of the passageway 3' through bore 60 and counter-bore 62 to passageway 19', the pressure will be relieved beneath the plunger 31' and the spring 41' will then force the plunger back to its initial position slightly above the inner face 53' of the cap member 17'.

It will be observed that the device shown in Fig. 2 ordinarily does not operate but is put into operation whenever desired by merely closing the valve 64 by pressing thereon with the finger. The length of life of the device is greatly increased by reason of the fact that it is not subjected to excessive wear. It operates only at the time that observation of fluid flow is desired.

Referring to Figures 3 and 5, the body portion 1" is formed with a passageway 3" and one or more slots 5". The upper end of the body member is threaded at 11" and the lower end is tapped at 13" to receive the caps 15" and 17" respectively. The passageway 19" is bored longitudinally of the body portion and is connected with the horizontal ports 21" and 23" which are threaded at their outer ends to receive the screw closures 25" and 27". The transparent, hollow, open-ended cylinder 29" is press-fitted into the body portion and has a plunger 31" reciprocally mounted therein. A coil spring 41" is mounted in the upper part of the passageway 3". The lower closure member has a passagaw 49" and is threaded at 51" to receive a suitable pipe coupling. The passageway 49" is of smaller diameter than the diameter of the plunger in order to enable the plunger to seat on the inner face 53" of the cap member.

The upper end of the passageway 19" is closed by the screw 80. The body portion is formed with protrusion 82 adjacent its upper end. A horizontal passageway 84 through the protrusion 82, connects the upper ends of the passageways 3" and 19" with the exterior of the body portion. The protrusion 82 is threaded at 86 to receive a suitable pipe coupling. The upper end 88 of the body portion 1" is bored at 90 to permit passage therethrough of the key or turning rod 92. The rod 92 is formed with a lip 94 adapted to rest on the surface of the upper end 88. Suitable packing material 96, held in place by the packing ring 98 and cap member 15", is placed around the rod 92 to prevent leakage through the bore 90.

The lower end of the rod 92 is adapted to fit into a vertical slot 100 formed in the upper portion of the plunger 31". The plunger is formed with a shoulder 102 in order to permit the coil spring 41" to abut against it. The plunger is also formed with a vertical slot 104 which extends inwardly to the center of the plunger and connects with a passageway 106 which is bored from the bottom of the plunger upwardly until it meets the slot.

The cylinder 29" is bored at 108 and at 110 in order to connect the interior of the cylinder 29" with the ports 23" and 21" respectively. The circumferential groove 112 is formed on the interior wall of the cylinder 29" so that it connects with the passageway 110. The length of the slot 104 along the exterior wall of the plunger 31" is slightly greater than the distance from the passageway 108 to the passageway 110. When the plunger 31" is at rest on the face 53" of the lower cap member, the top of the slot 104 is slightly above the passageway 108.

The rod member 92 has a horizontal handle 114 screwed thereon at 115, which handle is preferably pointed in the same direction as the slot 104. By turning the handle 114 the plunger 31" may be rotated in either direction.

The operation of the device shown in Fig. 3 is as follows: Assuming the plunger is at rest on the face 53" and is turned in the direction shown in Fig. 3, fluid pumped in through the inlet passageway 49" is forced upwardly through the passageway 106 and slot 104 but cannot escape therefrom. As a result, fluid pressure forces the plunger to move upwardly. When the plunger reaches the position shown in Fig. 3, communication between the slot 104 and the groove 112 is made, permitting the fluid to pass through the groove, passageway 110, port 21", passageway 19" and out through the outlet passageway 84. The plunger will remain in this position until the operator turns the plunger through 180 degrees, whereupon the slot 104 is placed in communication with the passageway 108. Since the fluid may now pass through passageways 106 and 108 through port 23", passageway 19" and out through outlet 84, the spring 41" will return the plunger to its initial position and it will remain in that position until the plunger is again turned by means of the handle 114 so that the slot 104 is out of communication with the passageway 108. The connection through the passageway 84 to the upper part of the passageway 3" avoids pressure or vacuum conditions in this part of the device.

It will be evident that the device shown in Fig. 3 is adapted to operate only when observation is desired. Moreover, the construction of the apparatus safeguards against destruction due to carelessness on the part of the operator since when the plunger reaches a given position it will stop by virtue of the passageway which is automatically formed from inlet to outlet.

The devices shown and described may be constructed with metallic cylinders in which the plungers reciprocate, and may be provided with sight windows to permit observation of the plunger.

Although I have shown but three modifications of my device, it is to be understood that the invention is not limited to the three modifications shown, but is intended to cover all modifications embodying a by-pass arrangement in connection with plunger, operator, and indicator, or intermittent type of indicator.

What I claim is:

1. A fluid flow indicator comprising a body portion having a passageway therethrough connected to an inlet and an outlet, a slidable member mounted in said passageway, said member preventing passage of fluid from said inlet to said outlet, a by-pass connecting said inlet and said outlet, and means cooperating with said by-pass to automatically permit passage of fluid therethrough only at the end of the forward stroke of said slidable member, means for effecting return of said slidable member to its initial position during flow of fluid through the indicator, and means for disclosing movement of said member.

2. A fluid flow indicator comprising a body portion having a passageway connected by an inlet and an outlet, a reciprocable member mounted in said passageway adapted to prevent passage of fluid from said inlet to said outlet, said member being adapted to be moved in one direction by fluid pressure, a spring adapted to assist the reciprocable member to slide in the opposite direction, a by-pass connecting said inlet and said outlet, means cooperating with said by-pass to prevent passage of fluid therethrough during the forward stroke of said member and to automatically permit fluid passage therethrough at the end of said forward stroke, means for effecting return of said slidable member to its initial position during flow of fluid through the indicator, and means for disclosing reciprocation of said member.

3. A fluid flow indicator comprising a body portion having a passageway connected by an inlet and an outlet, a reciprocable member in said passageway adapted to prevent passage of fluid therethrough, a by-pass connecting said inlet and said outlet, a closure adapted to prevent passage of fluid through said by-pass until said member has reached the end of its forward stroke, and to automatically permit flow of fluid therethrough at the end of said forward stroke, means for effecting return of said slidable member to its initial position during flow of fluid through the indicator, and means for disclosing reciprocation of said member.

4. An indicator in accordance with claim 3 in which the closure is a slidable valve actuated by said reciprocable member.

5. A fluid flow indicator comprising a body portion having a passageway connected to an inlet and an outlet, a reciprocable member snugly mounted in said passageway adapted to prevent flow of fluid therethrough, a by-pass connecting said inlet and said outlet, means for optionally permitting or preventing flow of fluid through said by-pass when said member is in its initial position, said reciprocable member being adapted to be moved through its forward stroke by the force of fluid pressure when said by-pass is closed,